A. P. LEE.
REVERSIBLE TRAILER.
APPLICATION FILED MAR. 10, 1920.
1,406,658.
Patented Feb. 14, 1922.
4 SHEETS—SHEET 1.
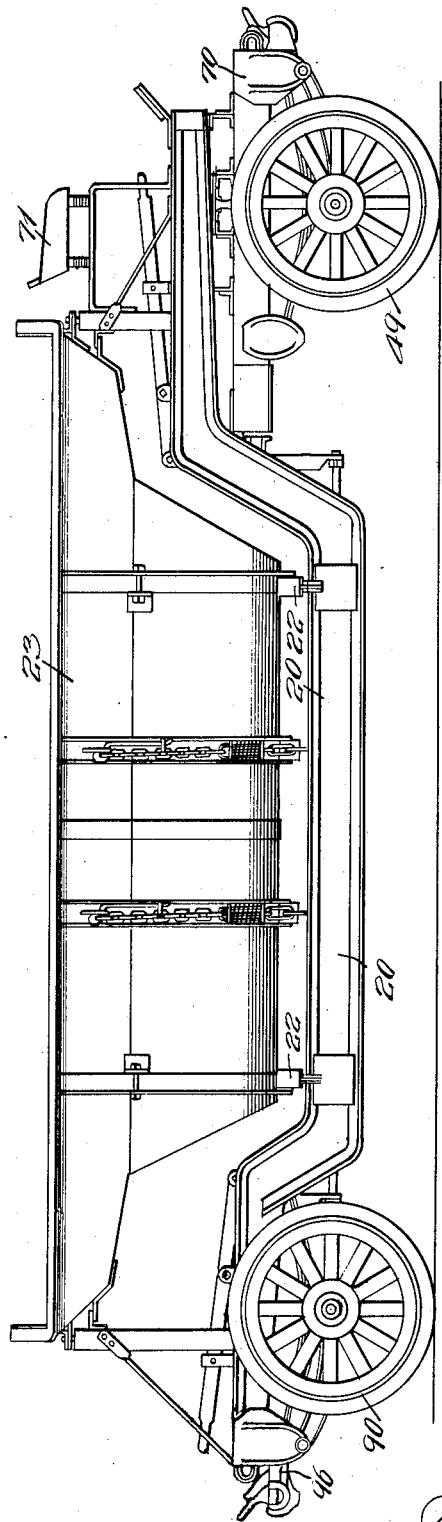
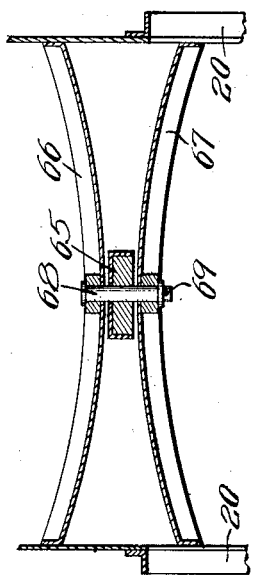

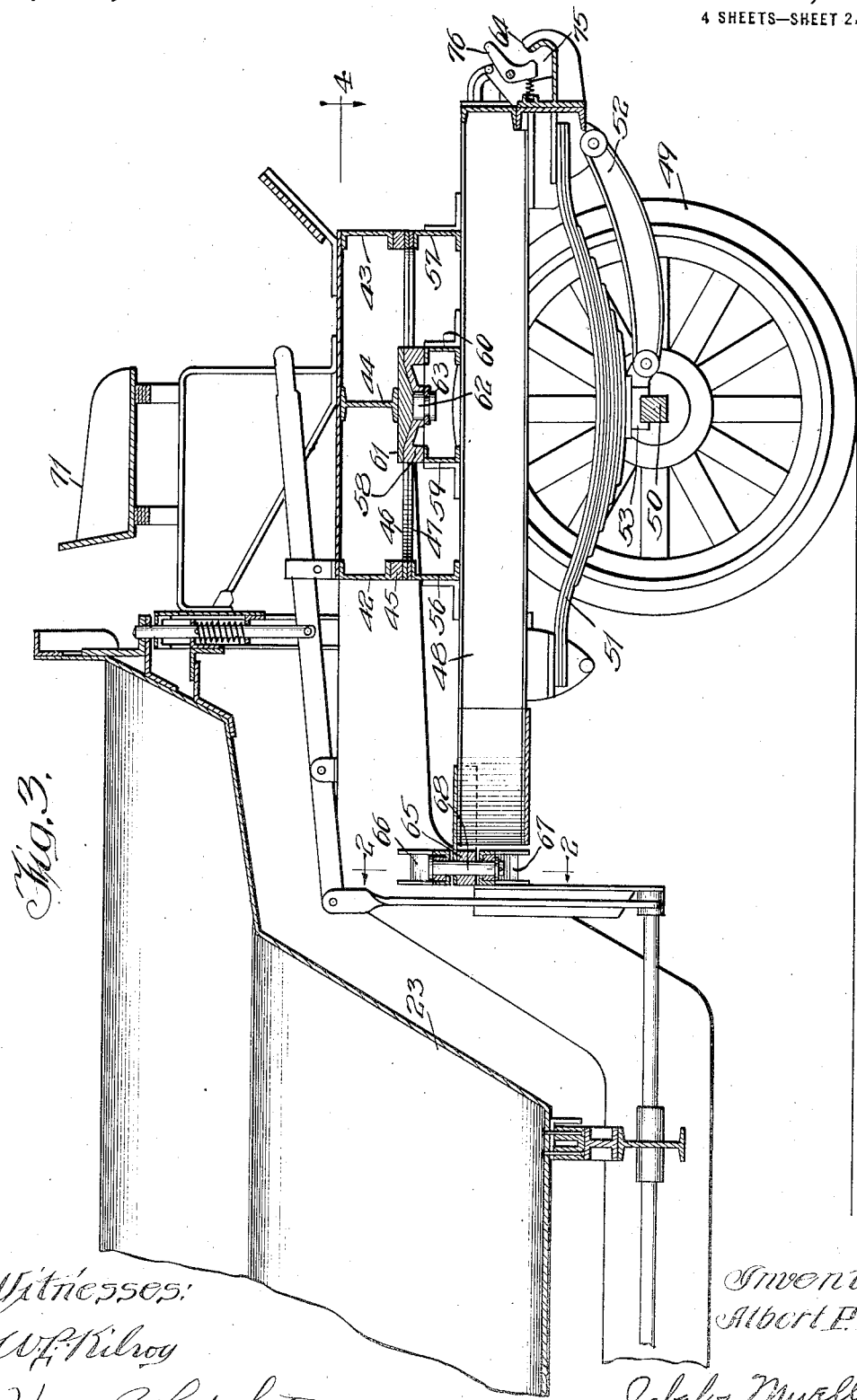

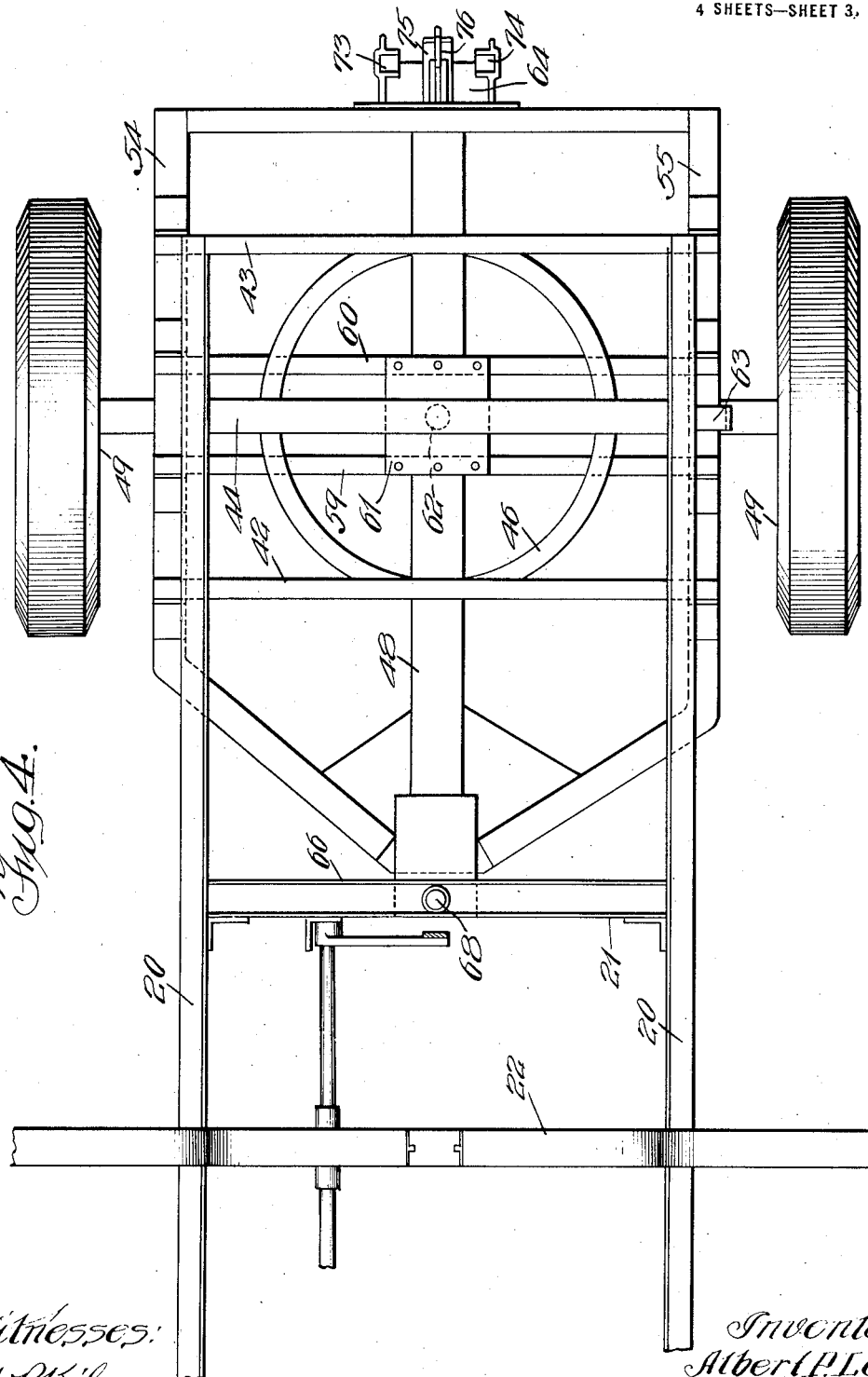

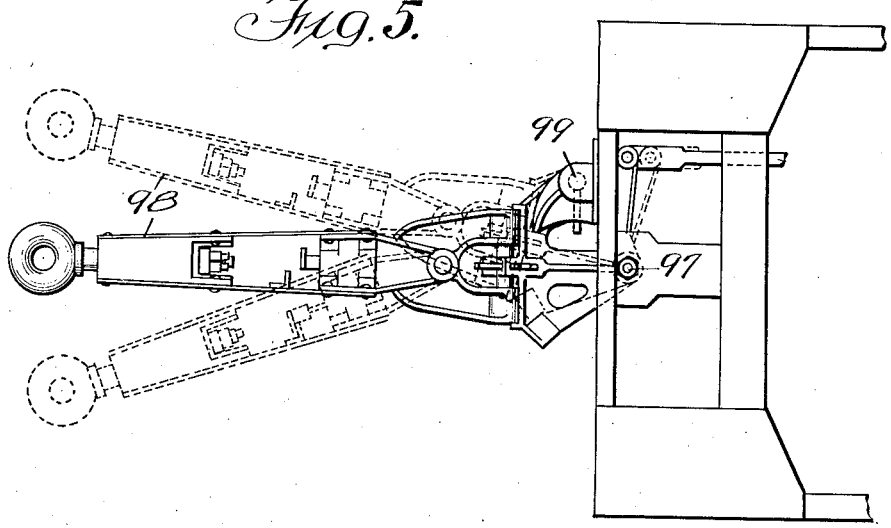
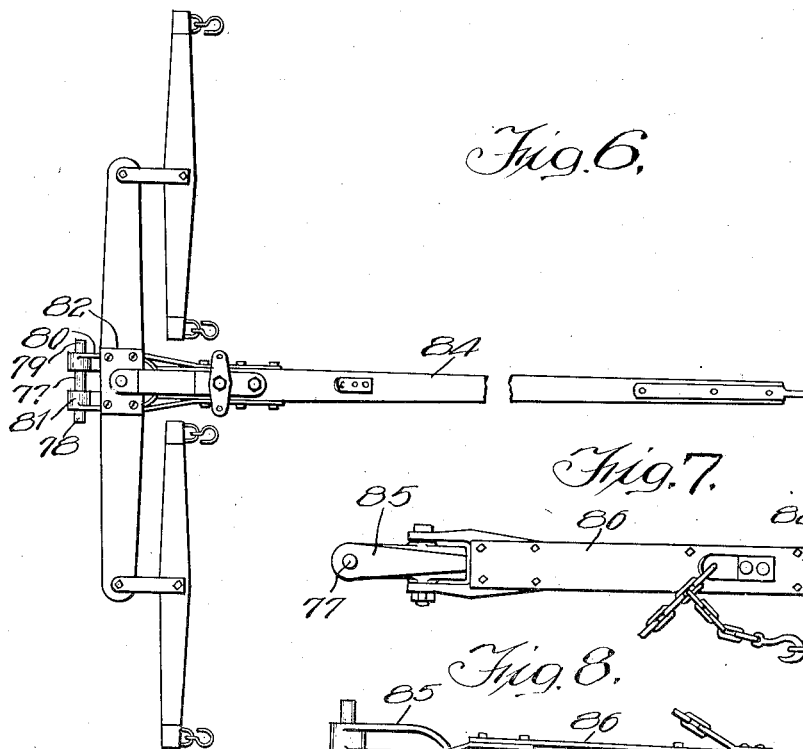
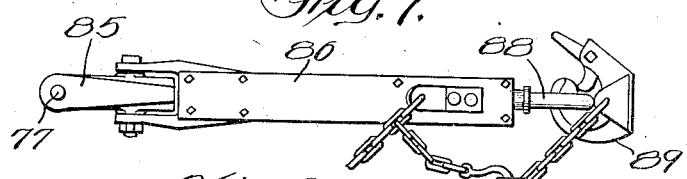
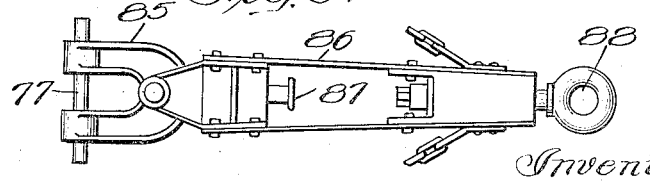

UNITED STATES PATENT OFFICE.

ALBERT P. LEE, OF CHICAGO, ILLINOIS, ASSIGNOR TO LEE TRAILER & BODY CO., OF CHICAGO, ILLINOIS.

REVERSIBLE TRAILER.

1,406,658.  Specification of Letters Patent.  Patented Feb. 14, 1922.

Application filed March 10, 1920. Serial No. 364,680.

*To all whom it may concern:*

Be it known that I, ALBERT P. LEE, a citizen of the United States, residing at Chicago, in the county of Cook and State of Illinois, have invented a certain new and useful Improvement in Reversible Trailers, of which the following is a full, clear, concise and exact description, reference being had to the accompanying drawings, forming a part of this specification.

My invention relates to trailers and has for its object the provision of a trailer construction of such a character that the trailer is adapted for use in a plurality of different ways.

I will state in general terms the preferred form of trailer which is the subject matter of my invention without however thereby intending to limit the invention to such structure complete in all its details as my invention contemplates structures so arranged that they may be adapted to fulfill all of the general functions set out in connection with the preferred form.

In this preferred form of trailer I utilize a frame work provided at one extremity thereof with steerable wheels mounted upon the customary steering knuckles, the steering of the wheels being under the control of a suitable draw bar head or draw bar so that the wheels may be steered by a traction or pulling vehicle. The arrangement is also such that these wheels may be locked against steering so that their action may be the same as that of wheels mounted upon a fixed axle. The other extremity of the trailer has one co-operating portion of a fifth wheel by means of which this trailer may be mounted bodily upon the rear extremity of a pulling vehicle having the other co-operating portion of the fifth wheel construction. The trailer is also provided with a truck frame work having two wheels which truck frame work has the other co-operating fifth wheel portion so that this truck frame work may be inserted in place at the extremity of the trailer frame work having the co-operating fifth wheel element, thus providing a four wheeled trailer. This truck frame work is so arranged that the frame work may rotate relatively to the trailer by virtue of the fifth wheel construction, but means are provided to lock the truck frame work against rotation relatively to the trailer. The truck frame work likewise has means for receiving the ordinary shafts of a wagon so that the trailer may be hauled by horses when it is desired. Under this condition of things the swinging action of the truck frame work relatively to the trailer is permitted. Both extremities of the trailer also have means for receiving a draw bar whereby the trailer may form a part of a vehicle train. This arrangement and construction of the trailer makes it possible to use it for a great variety of different purposes. In the first place the trailer may be associated with a pulling vehicle and steered thereby, in the second place the trailer may be connected bodily with a pulling vehicle through the agency of its fifth wheel element, thirdly the trailer may be converted into a horse drawn vehicle and fourthly by reason of the steerable mounting of both the front and rear wheels the trailer can be backed into positions ordinarily inaccessible.

In my improved trailer the fifth wheel end is so designed as to operate like a cut under wagon as distinct from many types of wagons which do not cut under. This is of special importance in this connection, because it allows the trailer when pulled by horses to be turned around in very narrow quarters, in fact, it will turn around within its own length.

I will explain one form which my invention may take more in detail by referring to the accompanying drawings illustrating the same, in which—

Fig. 1 is a side view of a trailer constructed in accordance with my invention;

Fig. 2 is a fragmentary sectional view on line 2—2 of Fig. 3;

Fig. 3 is a vertical longitudinal fragmentary sectional view of the trailer shown in Fig. 1;

Fig. 4 is a sectional view of the trailer on line 4—4 of Fig. 3;

Fig. 5 is a fragmentary top view showing the steering mechanism at the left hand extremity of the trailer of Fig. 1;

Fig. 6 is a top view of the shaft adapted for use in connection with the right hand extremity of the trailer of Fig. 1;

Fig. 7 is a side view of a draw bar which may be substituted for the shaft of Fig. 6 to adapt the vehicle for connection in a vehicle train; and Fig. 8 is a top view of the draw bar shown in Fig. 7.

Referring more particularly to Figs. 1 and 4 the trailer frame work consists of suitable channels 20 braced at different intervals by cross channels, such as the channels 21. This rigid frame work is provided with rails 22 upon which the hopper 23 is adapted to roll from its neutral position to a limiting position to either side of the center.

The right hand extremity of the trailer as shown more in detail in Figs. 1, 3, and 4 is provided with cross channels 42, 43 and the cross I-beam which together carry the rings 45, 46, forming one element of a fifth wheel structure. The other element of the fifth wheel structure includes the ring 47 which is mounted upon a truck frame work 48 removable bodily from engagement with the trailer. This truck frame work has the wheels 49 suitably supported upon a fixed axle 50 and provided with the necessary springs 51. Suitable radius rods or drag links 52 form a connection between the axle support 53 and the forward extremity of the truck frame work. The truck frame work has longitudinally extending channels 54, 55 suitably provided with the necessary cross pieces and also provided with cross channels 56, 57. The channels 56 and 57 together support the ring 47 forming part of the fifth wheel structure. The main support between the truck frame work and the trailer extremity is however provided by the bearing 58 carried upon cross channels 59, 60 provided upon the truck frame work. The bearing co-operates with a block 61 secured to the cross I-beam 44.

In order to hold the parts 58 and 61 together and to provide for pivoted action a king bolt 62 is mounted upon block 61, which king bolt may be held in position by the fork retainer 63. Whenever it is desired to uncouple the truck frame work from the trailer the fork retainer 63 is withdrawn, the right hand extremity of the trailer frame work raised so that the king bolt is clear of the bearing block 58 whereupon the truck frame work may be withdrawn.

The truck frame work also carries a coupler mechanism 64 which is arranged to receive either the shaft structure of Fig. 6 or the draw bar structure of Figs. 7 and 8. Both the draw bar and the shaft when in place steer the trailer by causing pivotal action of the truck frame work relatively to the trailer frame work when rounding corners. Whenever it is desired to lock the truck frame work against rotation relatively to the trailer frame work then certain instrumentalities come into play which consists of a tongue 65 carried upon the left hand extremity of the truck frame work (Fig. 3). The tongue projects into the space between the two cross channels 66 and 67 mounted upon the side channels 20 of the trailer frame work. The channels 66 and 67 are rounded as shown more clearly in Fig. 2 so as to insure the proper positioning of the tongue 65 when it is in the position shown in Figs. 2 and 3. In order to lock the tongue 65 in its central position so as to prevent relative rotation about the king bolt between the truck frame work and the trailer frame work I provide a bolt 68 which may be suitably held in place by cotter pin 69. This bolt when the parts are in the position indicated in Figs. 2 and 3 prevents such rotation between the truck frame work and the trailer frame work. When the bolt is withdrawn however the truck frame work can swing freely about the king bolt 62 relatively to the trailer frame work. The drag links 52 are pivotally secured to blocks 70 mounted upon opposite sides of the truck frame work at the further extremity thereof. The trailer frame work at its right hand extremity as shown in Fig. 1 is provided with a seat 71 for the accommodation of a driver in case the device is to be used as a horse drawn vehicle. The truck frame work as stated has the coupler structure 64. This structure includes sockets 73, 74 all forming part of the same part and also consisting of a third socket 75. The egress from the third socket may be prevented by a latch 76 depending upon whether the latch is thrown into its locking or unlocking position.

As will be more clearly seen from an inspection of Fig. 4 there is an open space provided between the sockets 73, 74 and 75. These sockets are adapted to receive the exposed intermediate portion of a shaft 77 and its protruding extremities 78 and 79 (Fig. 6). This shaft is supported in blocks 80 and 81 forming part of the cross tree 82. The cross tree 82 carries the shaft 84 all as shown in Fig. 6, the same being properly constructed for use in connection with horses. The shaft 84 together with its co-operating parts may be inserted in the coupling structure 64 and held in place by the catch 76. The guidance or swinging of the truck structure 48 is then done by means of the shaft 84 whenever the trailer is drawn by animals. Whenever it is desired to unite the trailer with a drawing vehicle so as to form part of a vehicle train then the draw bar shown in Figs. 7 and 8 may be employed. This draw bar has the shaft 77 with its protruding extremities so that it fits the coupler structure 54 in a manner similar to that explained in connection with the shaft 84. The shaft 77 is mounted in a block 85 pivotally supported upon the draw bar section 86 and may or may not be locked relatively thereto by a bolt 87 as more clearly explained in connection with my copending application Serial No. 306,201, filed June 23, 1919. When the bolt 87 is unlocked then the draw bar section 86 may swing relatively to the block 85. Under this condition of things the truck frame work 48 however must be locked in its central position by the bolt 68. This arrangement is of advantage when the trailer is being backed into a confined space through the agency of a pulling vehicle at which time it is also desirable to assist in this backing operation by steering the rear end of the trailer through the agency of the steerable wheels provided at the other extremity of the trailer.

The draw bar structure shown in Figs. 7 and 8 is provided with an eye 88 so that it may be associated with a coupler finger 89 provided upon the pulling vehicle. The right hand extremity of the trailer may therefore either be drawn by horseless vehicles or it may be drawn by horses.

The instrumentalities just described are such as to accommodate for either and to likewise accommodate for all of the varying conditions under which either such operation may take place.

It is furthermore to be noted that the right hand extremity of the trailer may be bodily mounted in place upon the rear extremity of a drawing vehicle provided of course this drawing vehicle has a co-operating fifth wheel element which may co-operate with the fifth wheel element provided at this extremity of the trailer. Under this condition of operation the truck frame work 48 is entirely withdrawn from its connection with the trailer. The left hand extremity of the trailer includes wheels 90 suitably swingingly carried upon knuckles as is customary and these wheels are steerable through the agency of the draw bar head 96 which draw bar head is pivotally carried upon the stem 97 all as more clearly shown and described in my copending application Serial No. 289,490, filed April 12, 1919.

The draw bar head has the socket 100 to receive a suitable draw bar 98 as shown in my said copending application. The draw bar head 96 swings normally with the swinging draw bar 98 and thus steers the wheels 90. A suitable lock 99 however is provided to prevent swinging movement of the draw bar head 96. Whenever the draw bar head 96 is locked in its central position the wheels 90 are held in a non-steerable position. If the vehicle is being actuated from the left hand extremity when the draw bar 96 is in its locked position then the actual draft requirements would necessitate unlocking the two relatively swinging sections of the draw bar as already explained in connection with the draw bar of Figs. 7 and 8.

From what has thus been described it will be noted that the trailer herein disclosed is reversible and may be drawn from either end. It will also be noted that should the draft vehicle be associated with one extremity of the trailer that the wheels at the opposite extremity may be steered during the backing operation. It will also have been noted that when the trailer is used as a horse drawn vehicle that it fulfills all of the conditions of such horse drawn vehicle and in addition that the rear wheels may be steered to assist during the backing operation, or that these rear wheels may even be steered to permit proper adjustment of the vehicle regardless of whether it is moved in one direction or another. It will also have been noted that the trailer may be converted into a semi trailer with the truck structure at one extremity thereof removed. The trailer is thus reversible and convertible into different types.

The description here given of one form which the invention may take is of course not intended to limit the scope of the invention.

What I claim as new and desire to secure by Letters Patent is:

1. A vehicle of the character described comprising a vehicle frame work, a truck provided with a pair of wheels at one extremity of said framework, said truck having coupling means for securing another vehicle thereto, a fifth wheel member on the opposite extremity of said framework, a demountable truck provided with a fifth wheel member adapted to co-operate with the fifth wheel member on said framework, means on said framework and said truck connecting said fifth wheel elements, means on said demountable truck for retaining said connecting means in holding position, means on said framework for steering said pair of wheels, and means on said demountable truck for steering the same, whereby said vehicle may be steered by draft means from either end thereof and by hand from one end thereof, or may steer a trailing vehicle coupled thereto.

2. A vehicle of the character described comprising a vehicle framework, a truck provided with a pair of wheels at one extremity of said framework, said truck having coupling means for securing another vehicle thereto, a fifth wheel member on the opposite extremity of said framework, a demountable truck provided with a fifth wheel member adapted to cooperate with the fifth wheel member on said framework, means on said framework and said truck connecting said fifth wheel elements, means on said demountable truck for retaining said connecting means in holding position, means on said framework for steering said pair of wheels, means on said demountable truck for steering the same, and means for independently locking either or both of said steering means, whereby said vehicle may be steered by draft means from either end thereof and by hand from one end thereof, or may steer a trailing vehicle, or may be used as a semi-trailer to be steered from the rear thereof while backing.

3. A device of the character described comprising a vehicle framework, a pair of wheels at one extremity of said framework, a steerable truck at the opposite extremity of said framework, and a coupler head mounted on said truck, said coupler head being provided with a coupler finger, adapted to cooperate with the end of a draw bar and sockets at each side of said finger, adapted to hold said draw bar from twisting about a vertical axis relative to said coupler head.

4. A device of the character described comprising a vehicle framework, a pair of wheels at one extremity of said framework, a demountable truck at the opposite end of said framework, cooperating separable fifth wheel elements on said framework and truck respectively, and means for locking said truck in a fixed position relatively to said framework, said means comprising a pair of transverse members on said framework, said members being oppositely curved to provide a gradually narrowing guideway toward the center thereof, an extension on said truck operating in said guideway, and means for detachably securing said extension to the central portions of said curved members.

5. A device of the character described comprising a vehicle framework, a pair of wheels at one extremity of said framework, a demountable truck at the opposite end of said framework, cooperating separable fifth wheel elements on said framework and truck respectively, and means for locking said truck in a fixed position relatively to said framework, said means comprising a pair of transverse members on said framework, said members being oppositely curved to provide a gradually narrowing guideway toward the center thereof, an extension on said truck operating in said guideway, the central portions of said curved guide members and said extension being provided with aligning apertures adapted to receive a bolt for holding said truck and framework in a relatively fixed position.

In witness whereof, I hereunto subscribe my name this 1st day of March, A. D. 1920.

ALBERT P. LEE.